(12) United States Patent
Kadambi et al.

(10) Patent No.: US 6,417,809 B1
(45) Date of Patent: Jul. 9, 2002

(54) COMPACT DUAL DIVERSITY ANTENNA FOR RF DATA AND WIRELESS COMMUNICATION DEVICES

(75) Inventors: Govind R. Kadambi, Lincoln, NE (US); Blaine Rexel Bateman, Louisville, CO (US); Ted Hebron, Lincoln, NE (US); Gary A. Cumro, Alvo, NE (US); Scott Witt, Lincoln, NE (US)

(73) Assignee: Centurion Wireless Technologies, Inc., Lincoln, NE (US)

( * ) Notice: Subject to any disclaimer, the term of this patent is extended or adjusted under 35 U.S.C. 154(b) by 0 days.

(21) Appl. No.: 09/929,978

(22) Filed: Aug. 15, 2001

(51) Int. Cl.$^7$ .............................. H01Q 1/24; H01Q 1/38
(52) U.S. Cl. ................. 343/702; 343/700 MS
(58) Field of Search .................. 343/702, 700 MS, 343/825, 829, 725, 729, 846, 848; H01Q 1/24, 1/38

(56) References Cited

U.S. PATENT DOCUMENTS

| | | | | |
|---|---|---|---|---|
| 5,420,599 A | * | 5/1995 | Erkocevic | 343/828 |
| 5,550,554 A | * | 8/1996 | Erkocevic | 343/828 |
| 6,339,402 B1 | * | 1/2002 | McKivergan | 343/702 |

* cited by examiner

*Primary Examiner*—Hoanganh Le
(74) *Attorney, Agent, or Firm*—Thomte, Mazour & Nierbergall; Dennis L. Thomte

(57) ABSTRACT

A compact dual diversity antenna for RF data and wireless communication devices having a printed circuit board is disclosed. First and second PIFAs are mounted on the PCB in a spaced relationship. Each of the first and second PIFAs include radiating elements having ground planes and shorting posts. The ground plane of the second PIFA is disposed in the same plane as the PCB. The ground plane of the first PIFA is orthogonally disposed with respect to the ground plane of the second PIFA. First and second feed posts connect the first and second PIFAs to the PCB through RF feed lines. The first and second feed posts are disposed perpendicularly to one another.

2 Claims, 2 Drawing Sheets

COMPACT DUAL DIVERSITY ANTENNA FOR RF DATA AND WIRELESS COMMUNICATION DEVICES

BACKGROUND OF THE INVENTION

1. Field of the Invention

This invention relates to a compact dual diversity antenna for RF data and wireless communication devices having a printed circuit board. More particularly, the antenna utilizes dual diversity PIFAs.

2. Description of the Related Art

In the simplest definition of the term, the diversity technique in the design of an antenna is a means of achieving reliable overall system performance through the use of an additional antenna. System performance may be characterized by signal strength, signal to noise ratio, data rate, error rate, or other factors. Of particular importance to wireless data systems is to achieve high data rates with low error rates.

Spatial diversity has been widely employed to improve the rate of data transfer by attempting to reduce the effects of multipath interference suffered by single antenna systems, by increasing the signal to noise ratio on average. In environments with multipath interference, signals reflecting from objects or structures arrive at the receiver at slightly different times, such that they are out of phase with one another, causing destructive interference and resulting in decreased signal strength. Spatial diversity means separation of two antennas by a distance such that when antenna one has a low signal strength due to destructive interference from multipath signals, antenna two will not have destructive interference and therefore will have a higher signal strength. In general, the spacing between the two antennas is from ½ lambda up to 2 lambda to achieve benefits from spatial diversity. Commonly, the two antennas are identical and oriented the same way, but this is not an explicit requirement for spatial diversity. With a spatial diversity antenna system, by suitable signal processing the average signal to noise presented to the receiver/transmitter can be higher then with a single antenna, with concomitant higher data rates.

However, it is known that not only phase changes but polarization changes take place in a multipath signal environment, and therefore polarization diversity has been utilized to further improve the rate of data transfer in cluttered environments. Polarization diversity means use of two antennas oriented such that in areas where antenna one has higher gain in one polarization, antenna two has higher gain in the orthogonal polarization. In general, polarization diversity is achieved by two antennas spaced some distance apart, often the same as or similar to spatial diversity, and having the orientation such that the polarization axes are approximately orthogonal. Again, by suitable signal processing, the average signal to noise can be increased using polarization diversity compared to a single antenna system, as well as increased average signal to noise compared to spatial diversity antenna systems.

Pattern diversity attempts to increase the rate of data transfer by increasing the effective gain of the antenna system. This is accomplished by arranging two or more antennas such that regions of low gain on any one antenna ("nulls") correspond to regions of higher gain on one of the other antennas. By suitable signal processing, the effective gain presented to the receiver/transmitter can be higher, on average, than with a single antenna. In mobile applications and in environments with multipath interference which are dynamic in nature, it is possible to increase the effective gain of the antenna using pattern diversity compared to single antenna systems or spatial diversity systems.

It is evident that certain combinations of the diversity techniques described might provide further increases in system performance. However, it has been impossible to simultaneously achieve a compact multiple antenna with these characteristics. This invention provides a compact dual diversity scheme wherein two antennas spaced closely together provide both pattern and polarization diversity.

SUMMARY OF THE INVENTION

A compact dual diversity antenna for RF data and wireless communication devices having a printed circuit board (PCB) is disclosed. A first planar inverted F antenna (PIFA) is mounted on the PCB. A second planar inverted F antenna (PIFA) is also mounted on the PCB in a spaced relationship to the first PIFA. Each of the first and second PIFAs include radiating elements having ground planes and shorting posts. The ground plane of the second PIFA is disposed in the same plane as the PCB. The ground plane of the first PIFA is orthogonally disposed with respect to the ground plane of the second PIFA. A first feed post connects the first PIFA to the PCB and a second feed post connects the second PIFA to the PCB through RF feed lines. The first and second feed posts are disposed perpendicularly to one another.

It is therefore a principal object of the invention to provide a compact dual diversity antenna for RF data and wireless communication devices having a printed circuit board.

A further object of the invention is to provide a device of the type described which makes it possible to retain the pattern performance of individual antennas of a spatial diversity scheme even when the separation between the antennas is only a fraction of a wavelength.

A further object of the invention is to provide a new scheme for designing a compact dual (both pattern and polarization) diversity antenna comprising PIFAs using a small ground plane.

Yet another object of the invention is to provide a compact dual diversity utilizing two PIFAs which are placed on the printed circuit board such that the individual ground planes of the radiating elements are orthogonal to each other.

Still another object of the invention is to provide an antenna of the type described wherein the feed/shorting posts of the two PIFAs are oriented along two mutually perpendicular axes.

Still another object of the invention is to provide an antenna of the type described above wherein the orthogonal placement of the two ground planes of the PIFAs ensures that the dominant polarization of each of the PIFAs is opposite to each other resulting in polarization diversity.

Yet another object of the invention is to provide a compact dual diversity antenna of the type described wherein the physical separation of the two PIFAs thereof in conjunction with the selective relative orientation of the feed/shorting posts of the individual PIFAs yields pattern diversity.

Still another object of the invention is to provide a compact dual diversity antenna of the type described which minimizes the excitation of the currents on the PCB of the system.

Yet another object of the invention is to provide a compact dual diversity antenna which achieves simultaneous pattern and polarization diversity.

These and other objects will be apparent to those skilled in the art.

DESCRIPTION OF THE PREFERRED EMBODIMENT

Figure 1:
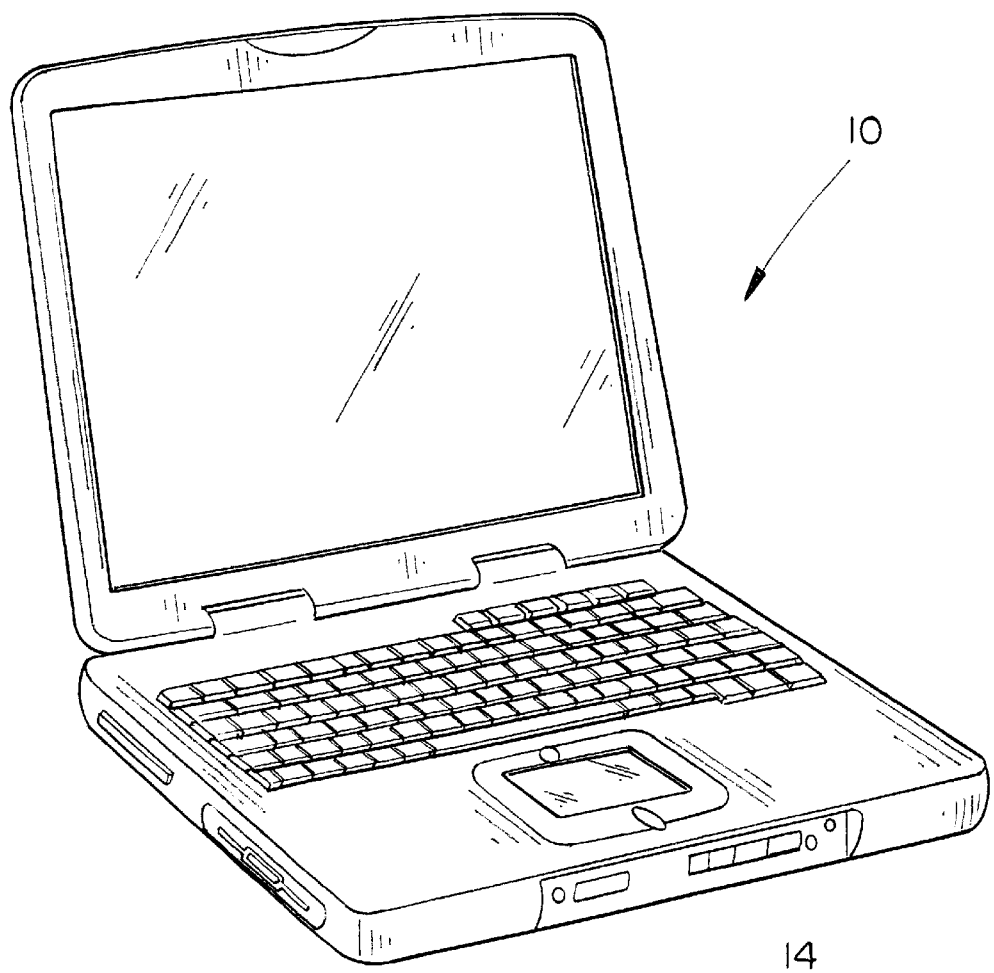
FIG. 1 is a perspective view of a typical RF data or wireless communication device.
Figure 2:
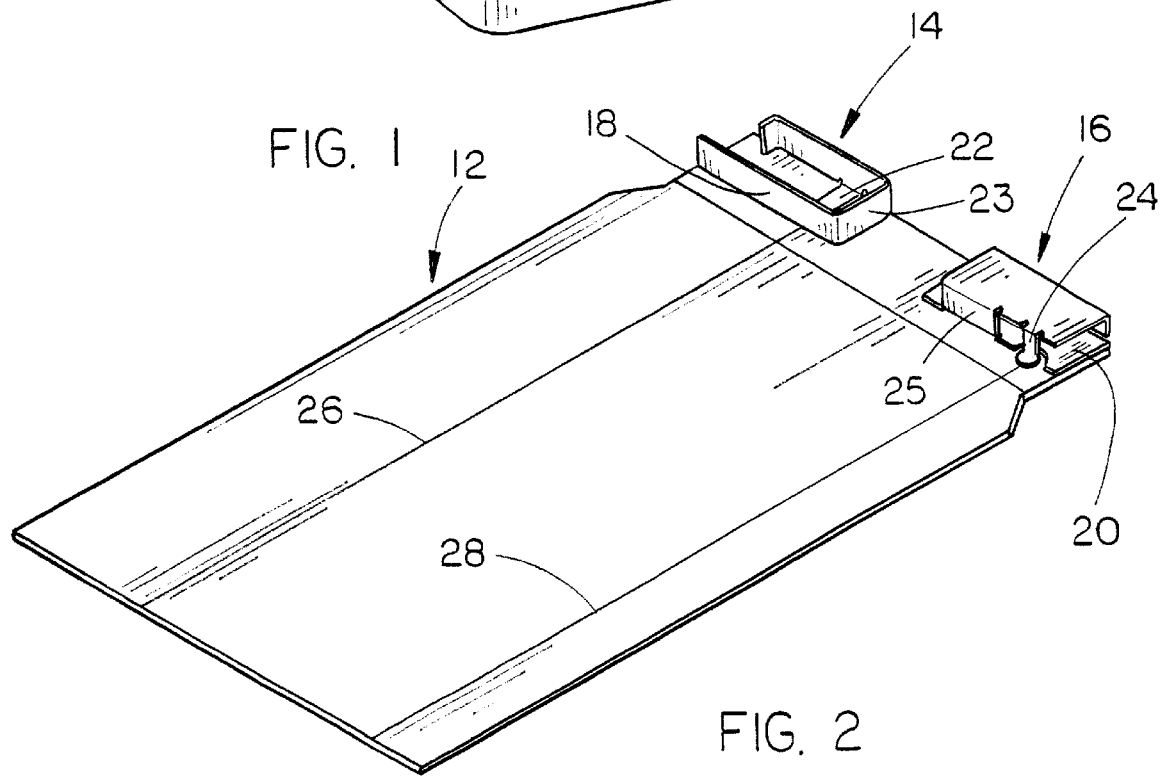
FIG. 2 is a perspective view of a printed circuit board having first and second planar inverted F antennas mounted thereon.
Figure 3:
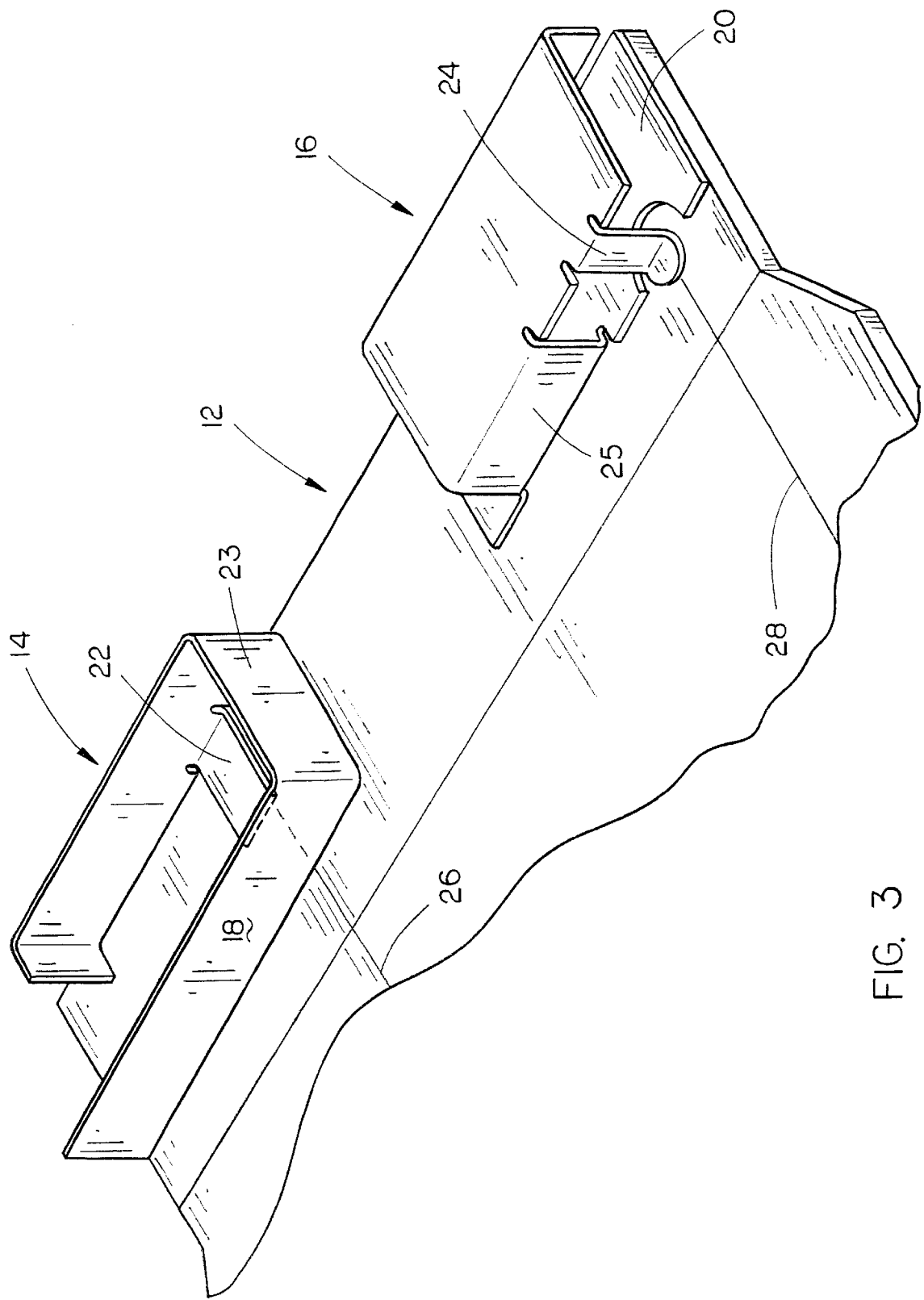
FIG. 3 is a partial perspective view illustrating the first and second PIFAs.

In FIG. 1, the numeral 10 refers generally to a wireless communication device for RF data and mobile communications. The wireless communication device 10 includes a printed circuit board (PCB) which is referred to generally by the reference numeral 12. The numeral 14 refers to a first planar inverted F antenna (PIFA) which is mounted on the PCB 12 while the reference numeral 16 refers to a second planar inverted F antenna (PIFA) mounted on the PCB in a spaced relationship to the first PIFA 14. PIFA 14 includes a ground plane 18 which is disposed in a manner so as to be perpendicular to the plane of the PCB 12. PIFA 16 includes a ground plane 20 which is disposed in the same plane as the plane of the PCB 12. PIFA 14 includes a feed post 22 which connects the PIFA 14 to the PCB 12. PIFA 14 also includes a shorting post 23. PIFA 16 includes a feed post 24 which connects the second PIFA 16 to the PCB 12. PIFA 16 also includes a shorting post 25. As seen in FIG. 3, the shorting posts 23 and 25 are disposed perpendicularly to one another. In the preferred embodiment, the first and second feed posts 22 and 24 are disposed perpendicularly to one another. As seen in FIG. 2, the numerals 26 and 28 refer to RF feed lines which extend from the feed posts 22 and 24 to the end of the PCB 12 forming the two ports.

The compact dual diversity antenna of this invention is so designed that spatial pattern diversity and polarization diversity is simultaneously achieved. The invention described herein makes it possible to retain the pattern performance of individual antennas of a spatial diversity scheme even when the separation between the antennas is only a fraction of a wavelength. The invention described herein is a new scheme or technique for designing a compact dual (both pattern and polarization) diversity antenna using PIFAs having small ground planes. In the antenna design of this invention, the PIFAs 14 and 16 are placed such that the individual ground planes of the individual radiating elements are orthogonal to each other. The orthogonal placement of the two ground planes ensures that the dominant polarization of each of the PIFAs is opposite to each other resulting in polarization diversity. The combination of the physical separation between the two PIFAs in conjunction with the selective relative orientation of the feed/shorting posts of the individual PIFAs yields pattern diversity. The orientation of the shorting posts of this invention ensures very good isolation between the two PIFAs despite being placed in close proximity to one another. To minimize the excitation of currents on the PCB of the system, one embodiment of the design of this invention inhibits the direct contact between the ground plane of the PIFAs and the ground potential of the PCB.

The basic concepts proposed in this invention have been proved through the design of diversity PIFAs for PCMCIA card applications wherein good VSWR performance was achieved. The satisfactory gain performance of the diversity PIFAs has also been retained. Without the loss of generality, the concept proposed in this design can be extended to other frequency bands of interest. The realization of simultaneous pattern and polarization diversity, termed as "dual diversity," is clearly a new concept with the innovative concept not involving additional structure complexities of the PIFAs.

Thus it can be seen that the invention accomplishes all of its stated objects.

We claim:

1. A compact dual diversity antenna for RF data and wireless communication devices having a printed circuit board (PCB), comprising:

a first planar inverted F antenna (PIFA) mounted on the PCB;

and a second planar inverted F antenna (PIFA) mounted on the PCB in a spaced relationship to said first PIFA;

each of said first and second PIFAs including radiating elements having ground planes and shorting posts;

said ground plane of said second PIFA being disposed in the same plane as said PCB;

said ground plane of said first PIFA being orthogonally disposed with respect to said ground plane of said second PIFA;

a first feed post connecting said first PIFA to the PCB through a RF feed line;

a second feed post connecting said second PIFA to the PCB through a RF feed line;

said first and second feed posts being disposed perpendicularly to one another.

2. A compact dual diversity antenna for RF data and wireless communication devices having a printed circuit board (PCB), comprising:

a first planar inverted F antenna (PIFA) mounted on the PCB;

and a second planar inverted F antenna (PIFA) mounted on the PCB in a spaced relationship to said first PIFA;

each of said first and second PIFAs including radiating elements having ground planes;

said ground plane of said second PIFA being disposed in the same plane as said PCB;

said ground plane of said first PIFA being orthogonally disposed with respect to said ground plane of said second PIFA.

* * * * *